Nov. 26, 1957     O. A. HANSEN     2,814,410
DOUBLE WALL TANK
Filed June 24, 1954
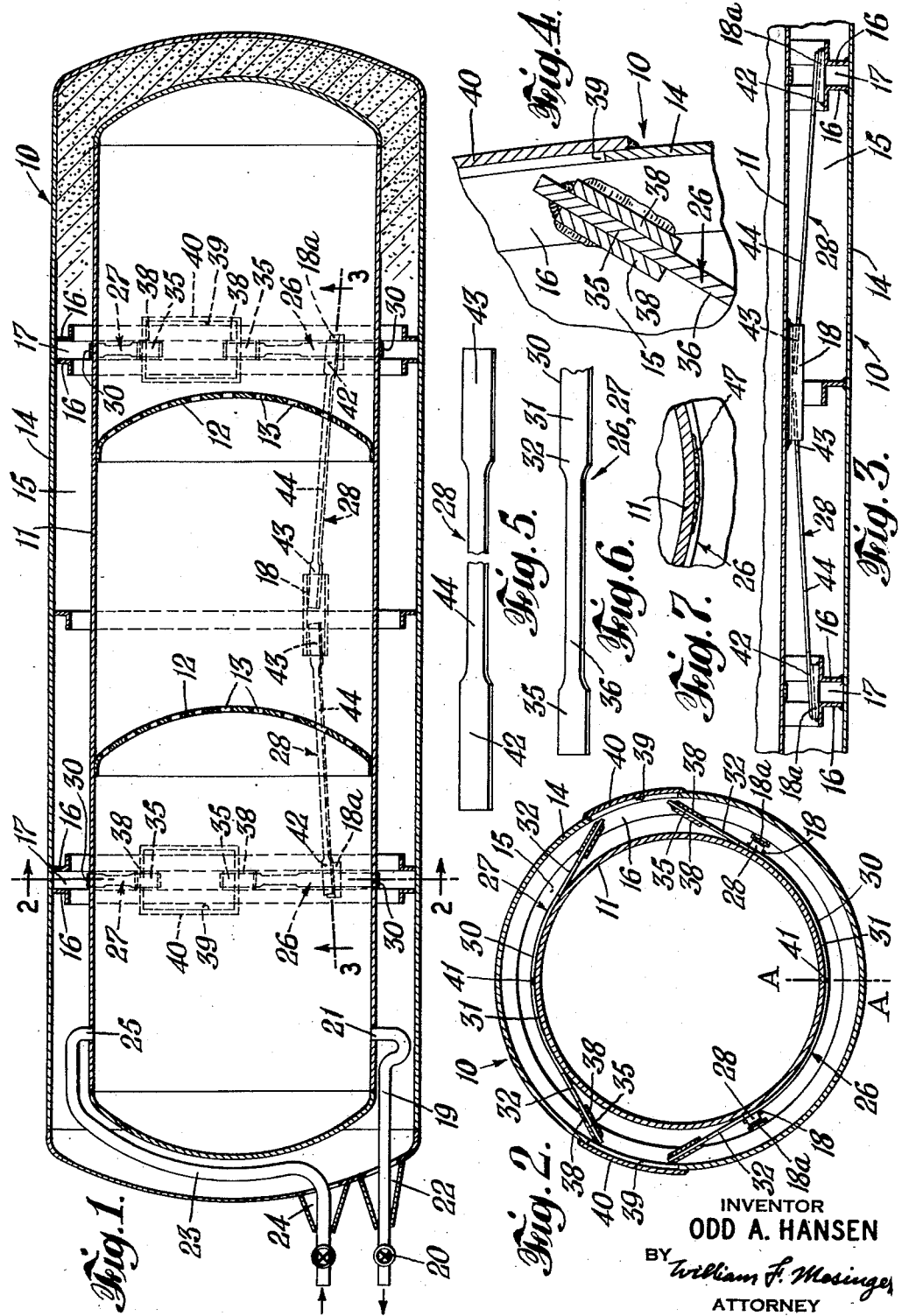
INVENTOR
ODD A. HANSEN
BY *William F. Mosinger*
ATTORNEY

United States Patent Office 2,814,410
Patented Nov. 26, 1957

2,814,410
DOUBLE WALL TANK

Odd A. Hansen, Kenmore, N. Y., assignor to Union Carbide Corporation, a corporation of New York Application June 24, 1954, Serial No. 439,069

4 Claims. (Cl. 220—15)

This invention relates to an improved load rod for supporting containers for the conveyance of volatile low temperature commercial products such as liquefied gases having boiling points at atmospheric pressure below 233° K., for example; liquid oxygen, or nitrogen.

A serious problem in the conveyance of low temperature products, such as liquid oxygen, in double-walled tanks such as storage tanks and tank cars is the gas loss due to heat leak. Although a highly effective powder in vacuum heat insulation is used between the walls to reduce heat inflow through the insulation space to a minimum, heat from the atmosphere is also transmitted by conduction from the external shell of the tank to the inner vessel wherein the liquefied gas is stored by numerous brace rods and reinforcements that are required to support the inner vessel in spaced relation to the outer shell wall. Efforts to reduce this heat leak by employing bracing material having high insulatory characteristics have not eliminated the problem. Nor has the employment of suspension chains through which heat must pass from link to link by line or point contact, proved to be more effective in reducing this heat leak problem. Chains require a relatively large quantity of metal to support a given load.

Because of the numerous supports that are required to support the inner vessel and its contents, and the many pathways afforded by such supports for the passage therethrough of heat leak, reduction in the cross sectional area of these supports offers an effective means for reducing normal heat leak. Reduction of the cross section of the load support offers other advantages, for example, a saving in material. Also, owing to the decrease in the size of the conductivity path, the load rod support can be fabricated from metal instead of materials of lower conductivity. Any metal of high tensile strength which is not embrittled at the low temperatures may be employed, so long as it is sufficiently reduced in cross sectional area to substantially constrict the flow rate of heat leakage. Preferably the metal chosen has high tensile strength at low temperatures as well as low heat conductivity in comparison to other metals.

It is, therefore, an important object of the present invention to provide an improved double-walled assembly comprising an outer vessel, an inner vessel, and a support means for suspending said inner vessel in spaced relation to said outer vessel, whereby heat leakage to said inner vessel is substantially reduced.

Another object of the present invention is to provide in a double-walled insulating tank having an outer cylindrical wall and an inner vessel suspended therein, an improved strap construction for suspending the inner vessel in the cylinder, whereby through a reduction in the cross sectional area of said strap, heat leakage between said cylinder and vessel is reduced substantially without impairing the strength requirements of said strap for safely sustaining the inner vessel in suspension.

Yet another object of the present invention is to provide a suspension strap adapted to resist the passage of heat therethrough, the strap comprising a thin elongated metallic member having therein reduced area portions so disposed as to reduce considerably the heat leakage transmitted therethrough without seriously limiting the load sustaining characteristics thereof.

Other objects, features and advantages of the present invention will be readily apparent from the following detailed description of certain preferred embodiments thereof taken in conjunction with the accompanying drawings in which:

Fig. 1 is a sectional elevational view of double-walled tank embodying the principles of the present invention;

Fig. 2 is a sectional view of the apparatus shown in Fig. 1, taken along the line 2—2;

Fig. 3 is an enlarged sectional view of a portion of the apparatus shown in Fig. 1, taken along the line 3—3;

Fig. 4 is an enlargement of a portion of the apparatus shown in Fig. 2, showing details of the attachment of the transverse load rods of the present invention to the tank wall;

Fig. 5 is an enlarged perspective view of the longitudinal load strap of the present invention;

Fig. 6 is an enlarged fragmentary view of the transverse load strap of the present invention showing important details thereof; and Fig. 7 is a sectional elevational view of a modified strap construction showing weld details thereof.

In Fig. 1 is shown a liquefied gas holding container or double-walled liquid cylinder 10 embodying the features of the present invention. The liquid cylinder 10 may be of conventional construction, having an elongated receptacle or inner pressure vessel 11 of impervious metal which is not embrittled at low temperatures, such as stainless steel, for holding liquefied gas material. Dished shaped baffle plates 12 welded to the inside wall of the vessel 11 and disposed at suitable intervals along the lentgh thereforth, provide added strength to the inner vessel for withstanding shock and temperature stresses. Holes 13 may be drilled in the baffle plates for equalizing liquid level and gas pressure within this container. The inner vessel 11 is jacketed by a larger gas-tight shell or outer vessel 14 of suitable metal or material completely encompassing the inner vessel, and providing an intervening evacuable space 15 to provide substantial resistance to heat leakage therethrough.

To reinforce the outer vessel 14, a plurality of annular angle bars 16 is provided. These angle members are preferably grouped in pairs and welded to the inner wall of the outer vessel 14 to define therein longitudinally spaced annular channels 17. The channels 17 may, if so desired, correspond in number, spacing and alignment with the baffle plates 12 in the inner cylinder 11. The inner vessel 11 is provided at its central diametral portion with wall anchorages or pads 18 for attachment of load sustainaing members. Low temperature products may be introduced into and removed from the inner vessel 11 by a conduit 19 having a control valve 20. This conduit 19 communicates with a bottom opening 21 in the inner vessel 11 and passes through a leak proof opening 22 in the end wall of shell 14. Gas pressure build-up during liquid filling may be discharged through a valve controlled conduit 23 which passes through a leak proof opening 24 in the shell 14 and terminates at an opening 25 in the top of the inner vessel 11.

The present invention resides in the employment of a simplified load strap for supporting low temperature bodies, the strap being constructed in certain critical proportions, preferably having a narrow neck or reduced section in certain portions therein, whereby improved heat leakage results are obtained along with other advantages, This narrow neck portion aids in reducing the quantity of heat leak in the strap, as the amount of heat leak is largely a function of cross sectional area, and length of heat path, especially when very narrow neck portions are employed. Because of the inclusion of an extremely narrow neck section in the load strap, the conductivity of the strap can be higher than in load straps previously used without increasing to any significant degree the amount of heat leak. Moreover, because higher conductivity materials may be employed in the fabrication of the present load strap, it may be made from high tensile strength material such as stainless steel.

Accordingly, the inner vessel 11 is effectively suspended by the load straps of the present invention from the walls of the encompassing shell. To suspend the vessel 11, there is provided a series of longitudinally aligned supporting straps 26 fastened at each end to the inside of the shell 14, and extending in a curve from one side of the shell to the other. Each of the straps 26 supportingly receives a portion of the weight of the vessel 11. Any number of straps may be used, two being illustrated in Fig. 1, the number of straps depending upon such factors as strap material and vessel weight.

The vessel 11 is held down on the supporting straps 26 by hold-down straps 27, which are substantially similar to the supporting straps 26. Each of these hold-down straps 27 is securely fastened at its ends to the inside of the shell.

For some purposes such as stationary tanks it will be unnecessary to also employ hold-down straps.

Longitudinal shifting of the vessel 11 may be prevented by two or more longitudinal straps 28 which are substantially longitudinally disposed in spaced pattern around the vessel 11, one end of each of the straps 28 being anchored to the inside of the shell 14 adjacent the end thereof, and the other end of each of said straps being anchored to the respective pad 18 at the approximate central diametral portion of the inner vessel 11. The longitudinal straps 28 are so located as to avoid interference with the inlet and discharge piping system, 19 and 23 of the assembly and with the transverse supporting and hold-down straps 26 and 27 respectively.

The strap 26 of the present invention may comprise an elongated strip of material made from a high tensile strength material such as stainless steel, and having a substantially uniform thickness throughout its length. Optimum results are obtained with load straps having some degree of flexibility so that impact stresses may be absorbed. For this reason a load strap of approximately ¼ inch thickness is preferred.

As shown in Figs. 2 and 6, the strap 26 comprises a central or medial section 30 having a curved segment 31 corresponding to the curvature of the inner cylinder 11 and disposed in nesting relation therewith, and a pair of spaced, flat segments 32 extending tangentially and divergingly from said curved segment 31 in spaced relation to the wall of the inner cylinder 11. A relatively short, flat, terminal or pad section 35 is provided at each end of the strap 26, and a flat neck or reduced area portion 36 of relatively narrow width, unites the pad sections 35 with the straight segments 32 of the medial section 30.

The central section 30 is preferably of elongated rectangular shape, and of predetermined width. A width of approximately two inches has been found to be satisfactorily adaptable for most purposes, but straps of wider or narrower widths may be employed, depending on the weight to be supported as well as the thickness and number of straps to be used.

Referring to Fig. 4, the pad portion 35 of the strap 26 is disposed between and filet welded to the edges of pads or weld plates 38. Since the pad portions are subsequently annealed, it is desirable to compensate for the lower yield strength at these points of attachment by providing a wider section of flat pad portion at each end. The weld plates 38 fit within the channel 17, and are in turn edge welded to the angle bars 16 defining said channel. An opening 39 in the shell affords access to the inside of the shell, so that edge welding of the welding plates may be conveniently accomplished. Upon completion of the weld attachment, the opening 39 is sealed by welding thereover a cover plate 40.

For heavier loads, a double thickness strap construction may be used, as by superimposing two transverse straps 26 adjacent each other, filet welding them between the weld plates 38, and then welding the plates 38 to the same angle bars 16.

In order to more fully appreciate the invention, it should be noted at this point that the neck portion 36 of the strap 26 is so disposed therein that maximum reduction in the cross sectional area may be effected. It will be seen, see Fig. 2, that at each end of the strap, the pad section 35, neck 36, and straight segment 32 lie substantially in the same plane. Because this flat portion of the strap is subject mainly to tensile forces, and due to the fact that metals such as stainless steel are strongest in tension, a minimum neck area may be provided in the flat portion of the strap without reducing the load-carrying capacity of the strap.

It will be further noted that in the strap 26 illustrated in Figs. 2 and 6, the highest concentration of flexure stresses occurs at the upper and lower surfaces of strap in the cross plane A—A shown in Fig. 2. The magnitude of these flexure stresses depends largely upon the thickness of strap, all other things being equal, thicker straps naturally being more prone to failure by rupture due to flexure than thinner straps. It, therefore, follows that because of the relative thinness of the strap 26, the inducement of excessive flexure stresses is avoided. Moreover, owing to the substantiality of the width of strap in the region of the upper and lower surfaces of the strap at cross plane A—A, the flexure stresses induced at this point are absorbed over a substantial cross sectional area. Herein lies one of the important engineering advantages that the present rectangular cross sectional strap possesses over load rods of circular cross section.

In circular cross sectioned load rods, maximum flexure stress also occurs at the midpoint of the load rod. But this corresponding point is a point of minimum contact area. Rectangularly cross sectioned load strips on the other hand have a greater area of contact. As a consequence, strap failure due to overstress is less likely to occur in rectangularly cross sectioned straps than in circularly cross sectioned straps of equal width.

Inasmuch as maximum stress concentrations are developed at the midpoint of the strap, optimum results are obtained if the load strap is made in two parts instead of one and welded together, the welded juncture being disposed at the midpoint of the composite strap. In this way the weld forms the strongest part of the load strap, and, in this instance, imparts additional strength to the strap in the region of maximum stress concentrations. Fig. 2 illustrates this construction as a preferred embodiment of the invention, the central weld being denoted by the reference character 41. However, it is to be understood that the invention is not intended to be restricted to centrally welded load straps. Load straps may be made in one piece or from any number of parts, provided that the weld is made in the wide portions of the strap, without departing from the scope of the invention.

Each of the longitudinal straps 28 comprises a pair of terminal or pad contacting portions 42, 43 joined together by a relatively long and narrow body portion 44. Each longitudinal strap 28 is disposed with one pad end 42 attached, as by edge welding, to the legs of the channel pad 18 welded to the center of inner vessel 11 and extending divergently forwardly and rearwardly toward the outer shell 14. The other pad end 43 is welded to the wedge pad 18a, welded on the angle bars 16. Preferably, the longitudinal straps 28 are paired in end to end relation and are symmetrically disposed about the inner vessel 11, the adjacent pad ends 42 being edge welded to and located at the approximate center of the inner cylinder 11, so that the center of the inner vessel cannot move during temperature changes. Center fastening of the straps 28 also eliminates the need for spring loaded sway straps to compensate for contraction of the inner vessel.

The particular size, shape and manner of attachment of the load straps described and illustrated hereinabove are not intended as limitations or restrictions on the practice of the instant invention. For instance, longitudinal load straps of greater length than the load straps 28, and extending substantially the length of the inner vessel 11, may be used as load sustaining members in the double-walled tank described hereinabove. Instead of being center attached, each of these longer load straps may be attached so that one end thereof is secured to one end of the outer shell 14 and the other end secured to the inner vessel 11 adjacent the other end of the shell. Moreover, these straps may be arranged so that at any one end of the container 10, consecutive longitudinal strap ends are alternatingly attached to the inner vessel 11 and the outer shell 14. These longitudinal straps may also be grouped in pairs so that they are disposed in crossed relation to each other. Similarly, the transverse load straps 26 may be suitably disposed to effect a desired pattern or arrangement.

In the modification shown in Fig. 7, torsion in the longitudinal straps is avoided by preventing rotation of the inner cylinder 11 relative to the shell 14. To this end the inner cylinder 11 is supported by load straps 26, which are edge welded at 47 at their center to the center of the cylinder 11. To further prevent turning of the cylinder, the hold-down straps 27 may be similarly welded to the top of the cylinder.

From the above it will be seen that the heat leak by conduction may be substantially reduced by load straps constructed in accordance with the principles of the present invention. By providing rectangularly cross sectioned load strap with reduced area portions, the path of heat flow is considerably reduced, and the amount of heat loss is correspondingly decreased. Using strap materials of high tensile strength means that reduced area portions therein will not affect the load carrying capacity of the straps to any significant degree. A thin rectangular cross section is found to provide a higher safe tensile strength per square inch than a round section of equal strength. Provision for wider pad portions in the strap of the present invention permits welding without affecting the strength of reduced width portion therein.

Other advantages arising out of the use of the load straps of the present invention are:

(1) End adjustment of the longitudinal and transverse supporting load straps is eliminated. Thus space is saved and flush surface outer shell containers can be supplied.

(2) Center attachment of the longitudinal load straps eliminates movement of the center of the inner vessel when said vessel is filled with low temperature products.

(3) Rectangularly cross sectioned load rods of austenitic stainless steel may be cold rolled to higher uniform strengths than nominal round rods. The latter does not possess uniform strength throughout its cross section, being of higher strength at the outer surface. As a result, load rods with higher yield strength may be used, and at the same time less material is required.

It will be understood that modifications and variations may be effected without departing from the scope of the novel concepts of the present invention.

What is claimed is:

1. In a double-walled tank for the conveyance of low temperature products, including an inner cylindrical container and an outer shell, a plurality of transverse supporting straps for suspending said inner container inside said shell, and a plurality of longitudinal straps for avoiding longitudinal displacement of said inner container, each of said straps having reduced area portions therein for impeding the flow of heat leak therethrough, said longitudinal straps being arranged in pairs in end to end relation around said inner container, the adjacent terminal portions thereof being secured to the center of the inner container, and the opposed terminal portions thereof being secured to the outer shell, whereby tension adjustment of said straps, due to temperature changes in said inner container, is substantially eliminated.

2. In a double-walled tank for the conveyance of low temperature products, including an inner cylindrical container and an outer shell, a plurality of transverse supporting straps for suspending said inner container inside said shell, each of said transverse supporting straps being anchored midway between its ends to said inner container, each of said straps having reduced area portions therein for impeding the flow of heat leak therethrough, whereby tension adjustment of said straps due to temperature changes in said inner container is substantially eliminated.

3. In a double-walled tank for the conveyance of low temperature products, including an inner cylindrical container and an outer shell, the improvement being a strap construction for supporting said inner container inside said shell without provision for self-adjusting apparatus to compensate for stresses that may be induced as a result of temperature changes in the inner container, said improvement comprising a plurality of transverse supporting straps girdling the bottom of said inner container for suspending said inner container inside said shell, said straps being of a metal of high tensile strength which is not embrittled at low temperatures, and the yield strength of which is reduced by the heat of welding, each of said straps having at opposite ends thereof a terminal portion of substantially increased width, said terminal portions being end welded to said shell, and a narrow neck portion of predetermined width disposed adjacent each of said terminal portions between said inner container and said shell, whereby said narrow neck portions provide substantial resistance to the passage of conductive heat therethrough.

4. In a double-walled tank for the conveyance of low temperature products, including an inner cylindrical container and an outer shell, a plurality of longitudinal supporting straps having reduced area portions therein for impeding the flow of heat leak therethrough, said longitudinal straps being arranged in pairs and in end-to-end relation around said inner container, the adjacent terminal portions thereof being end-welded to the center of the inner container and the opposed terminal portions being end-welded to the outer shell, whereby tension adjustment of said straps due to temperature changes in said inner container is substantially eliminated.

References Cited in the file of this patent

UNITED STATES PATENTS

| | | |
|---|---|---|
| 2,458,060 | Clower | Jan. 4, 1949 |
| 2,587,204 | Patch et al. | Feb. 26, 1952 |
| 2,592,974 | Sulfrian | Apr. 15, 1952 |

FOREIGN PATENTS

| | | |
|---|---|---|
| 212,271 | Switzerland | Feb. 3, 1941 |

OTHER REFERENCES

Publication "The Making, Shaping and Treating of Steel" by Carnegie, Illinois Steel Corporation, 5th edition, page 527.